United States Patent
Radha et al.

(10) Patent No.: US 11,127,295 B2
(45) Date of Patent: Sep. 21, 2021

(54) VISUAL SENSOR FUSION AND DATA SHARING ACROSS CONNECTED VEHICLES FOR ACTIVE SAFETY

(71) Applicant: BOARD OF TRUSTEES OF MICHIGAN STATE UNIVERSITY, East Lansing, MI (US)

(72) Inventors: Hayder Radha, East Lansing, MI (US); Hothaifa Al-Qassab, Sterling Heights, MI (US)

(73) Assignee: Board of Trustees of Michigan State University, East Lansing, MI (US)

(*) Notice: Subject to any disclaimer, the term of this patent is extended or adjusted under 35 U.S.C. 154(b) by 0 days.

(21) Appl. No.: 16/489,943

(22) PCT Filed: Jan. 22, 2019

(86) PCT No.: PCT/US2019/014547
§ 371 (c)(1),
(2) Date: Aug. 29, 2019

(87) PCT Pub. No.: WO2019/147569
PCT Pub. Date: Aug. 1, 2019

(65) Prior Publication Data
US 2020/0349842 A1     Nov. 5, 2020

Related U.S. Application Data

(60) Provisional application No. 62/620,506, filed on Jan. 23, 2018.

(51) Int. Cl.
*G08G 1/16* (2006.01)
*G08G 1/01* (2006.01)

(52) U.S. Cl.
CPC ........... *G08G 1/163* (2013.01); *G08G 1/0112* (2013.01)

(58) Field of Classification Search
CPC ...... G08G 1/163; G08G 1/0112; G08G 1/162; G08G 1/164; G08G 1/166;
(Continued)

(56) References Cited

U.S. PATENT DOCUMENTS

| 6,650,252 B2 * | 11/2003 | Miller, Jr. | G01C 21/26 340/988 |
| 7,061,373 B2 * | 6/2006 | Takahashi | G08G 1/166 340/435 |

(Continued)

OTHER PUBLICATIONS

Khayam, S. et al., "Analyzing the Spread of Active Worms over VANET," Vanet, Oct. 1, 2004, 2 pages.
(Continued)

*Primary Examiner* — Luis A Martinez Borrero
(74) *Attorney, Agent, or Firm* — Harness, Dickey & Pierce, PLC

(57) ABSTRACT

By exchanging basic traffic messages among vehicles for safety applications, a significantly higher level of safety can be achieved when vehicles and designated infrastructure-locations share their sensor data. While cameras installed in one vehicle can provide visual information for mitigating many avoidable accidents, a new safety paradigm is envisioned where visual data captured by multiple vehicles are shared and fused for significantly more optimized active safety and driver assistance systems. The sharing of visual data is motivated by the fact that some critical visual views captured by one vehicle or by an infrastructure-location are not visible or captured by other vehicles in the same environment. Sharing such data in real-time provides an invaluable new level of awareness that can significantly enhance a driver-assistance, connected vehicle, and/or autonomous vehicle's safety-system.

21 Claims, 7 Drawing Sheets

(58) Field of Classification Search
CPC ............ G08G 1/096791; G08G 1/005; G01C 21/3407; G01C 21/3697; G01C 21/3415; G01C 21/26; G01C 21/34; G01C 21/28; G01C 21/30; G01C 21/3658; G01C 21/3453; B60W 2556/65; B60W 2554/801; B60W 50/14; B60W 30/16
See application file for complete search history.

(56) References Cited

U.S. PATENT DOCUMENTS

| | | | | |
|---|---|---|---|---|
| 7,994,902 B2* | 8/2011 | Avery | .................... | G08G 1/161 340/435 |
| 8,155,883 B2* | 4/2012 | Yasuhara | ............... | G08G 1/005 701/445 |
| 8,229,663 B2* | 7/2012 | Zeng | .................... | G01S 13/726 701/301 |
| 8,505,059 B2 | 8/2013 | Cho et al. | | |
| 8,792,744 B2 | 7/2014 | Conger et al. | | |
| 9,349,293 B2* | 5/2016 | Beaurepaire | ............ | B60Q 1/50 |
| 9,547,989 B2 | 1/2017 | Fairfield et al. | | |
| 9,679,487 B1 | 6/2017 | Hayward | | |
| 9,681,147 B2 | 6/2017 | Mahfoodh et al. | | |
| 9,725,037 B2* | 8/2017 | Goudy | .................... | G08G 1/097 |
| 9,786,171 B2* | 10/2017 | Prokhorov | ............. | G08G 1/205 |
| 9,796,327 B2* | 10/2017 | Goudy | .................... | B60Q 9/008 |
| 9,805,601 B1* | 10/2017 | Fields | .............. | G08G 1/096725 |
| 9,842,496 B1* | 12/2017 | Hayward | ................ | G01S 19/13 |
| 9,898,667 B2* | 2/2018 | Kang | ............... | G08G 1/096791 |
| 9,903,733 B2* | 2/2018 | Bai | .................... | G01C 21/3697 |
| 9,922,565 B2* | 3/2018 | Thomas | ................ | B60W 30/08 |
| 9,997,077 B2* | 6/2018 | Oshida | .................. | B60K 28/06 |
| 10,019,901 B1* | 7/2018 | Fields | .............. | G08G 1/096791 |
| 10,074,280 B2* | 9/2018 | Bai | .................... | G08G 1/161 |
| 10,163,350 B1* | 12/2018 | Fields | .................... | G07C 5/008 |
| 10,291,680 B2 | 5/2019 | Radha | | |
| 10,325,491 B1* | 6/2019 | Fields | .................... | H04W 4/46 |
| 10,343,605 B1* | 7/2019 | Fields | .................... | G06Q 50/00 |
| 10,460,534 B1* | 10/2019 | Brandmaier | .......... | G07C 5/008 |
| 10,470,131 B2* | 11/2019 | Son | .................. | G08G 1/096791 |
| 10,699,563 B1* | 6/2020 | Oron | .................... | G01S 7/4808 |
| 10,748,419 B1* | 8/2020 | Fields | .................... | G07C 5/008 |
| 10,748,425 B2* | 8/2020 | Takemori | ............ | G08G 1/0962 |
| 10,757,485 B2* | 8/2020 | Al-Stouhi | ............. | G07C 5/008 |
| 10,769,954 B1* | 9/2020 | Fields | .............. | G08G 1/096758 |
| 10,972,975 B2* | 4/2021 | Song | .................... | G08G 1/164 |
| 2005/0030202 A1* | 2/2005 | Tsuboi | ............. | G08G 1/096758 340/901 |
| 2007/0147371 A1 | 6/2007 | Radha et al. | | |
| 2007/0242744 A1 | 10/2007 | Radha et al. | | |
| 2008/0025204 A1 | 1/2008 | Radha et al. | | |
| 2008/0037434 A1 | 2/2008 | Radha et al. | | |
| 2008/0117904 A1 | 5/2008 | Radha et al. | | |
| 2009/0133123 A1 | 5/2009 | Radha et al. | | |
| 2009/0190492 A1 | 7/2009 | Khayam et al. | | |
| 2009/0199064 A1 | 8/2009 | Radha et al. | | |
| 2010/0198513 A1* | 8/2010 | Zeng | .................... | G01S 17/931 701/300 |
| 2010/0214085 A1* | 8/2010 | Avery | .................... | G08G 1/161 340/435 |
| 2014/0104416 A1* | 4/2014 | Giordano | ............... | G01B 11/02 348/135 |
| 2014/0324247 A1* | 10/2014 | Jun | ...................... | G07C 5/0866 701/1 |
| 2015/0035685 A1* | 2/2015 | Strickland | ............. | B60Q 1/525 340/901 |
| 2015/0296289 A1* | 10/2015 | Lakkundi | ............... | H04R 3/005 381/92 |
| 2015/0356864 A1 | 12/2015 | Hutchings | | |
| 2016/0071418 A1* | 3/2016 | Oshida | ................ | B60W 30/165 701/23 |
| 2016/0086041 A1* | 3/2016 | Stein | .................. | G06K 9/00805 348/148 |
| 2016/0246302 A1* | 8/2016 | Liao | ...................... | G01C 21/20 |
| 2016/0275790 A1* | 9/2016 | Kang | .................. | G07C 5/0866 |
| 2016/0277911 A1* | 9/2016 | Kang | .................. | H04B 1/3822 |
| 2017/0018187 A1* | 1/2017 | Kim | ...................... | G08G 1/166 |
| 2017/0213462 A1* | 7/2017 | Prokhorov | ........... | G08G 1/0965 |
| 2017/0268896 A1* | 9/2017 | Bai | .................... | G01C 21/3697 |
| 2018/0025632 A1 | 1/2018 | Breed et al. | | |
| 2018/0096605 A1* | 4/2018 | Bai | ....................... | G08G 1/161 |
| 2018/0156624 A1* | 6/2018 | Bai | ....................... | G08G 1/162 |
| 2018/0261095 A1* | 9/2018 | Qiu | ..................... | G05D 1/0022 |
| 2018/0330481 A1* | 11/2018 | Watanabe | ................ | G06T 7/20 |

OTHER PUBLICATIONS

Patra, S. et al., "An ITS Solution Providing Real-Time Visual Overtaking Assistance Using Smartphones," 40th Annual IEEE COnference on Local Computer Networks, 2015, pp. 479-487.

Radha, H., "Spartans Map the Future for Self-Driving Vehicles," https://research.msu.edu/msu-contributes-to-autonomous-vehicle-research, Oct. 11, 2016, 4 pages.

Alusheff, A., "From MSU, a self-driving car that handles Michigan winters," https://www.lansingstatejournal.com, Jan. 11, 2017, 2 pages.

Oswald, T. And Radha, H., "MSU Contributes to Autonomoums-Vehicle Research," https://msutoday.msu.edu, Sep. 27, 2016, 2 pages.

Hartman, K., "Connected Vehicle Pilot Deployment Program," U.S. Department of Transportation, Office of the Assistant Secretary for Research and Technology, 18 pages.

Hartman, K., "Connected Vehicle Pilot Deployment Program—Session 1: Deployment Status and Demonstration Impact," ITS World Congress Oct. 29-Nov. 2, 2017, 64 pages.

Hartman, K., "Connected Vehicle Pilot Deployment Program—Session 2: Technical Challenges and Proposed Solutions," ITS World Congress Oct. 29-Nov. 2, 2017, 25 pages.

* cited by examiner

VISUAL SENSOR FUSION AND DATA SHARING ACROSS CONNECTED VEHICLES FOR ACTIVE SAFETY

CROSS-REFERENCE TO RELATED APPLICATIONS

This application is a National Phase Entry of International Application Serial No. PCT/US2019/014547, filed on Jan. 22, 2019, which claims the benefit of U.S. Provisional Application No. 62/620,506, filed on Jan. 23, 2018, both of which are incorporated herein by reference.

FIELD

The present disclosure relates to visual sensor fusion and data sharing across vehicles for improved safety.

BACKGROUND

Vehicle-accident related fatalities, especially those caused by human errors exceed more than one million every year worldwide. In response to such statistics, a variety of safety measures have been proposed. In particular, in the United States, the US Department of Transportation (USDOT) in collaboration with state-level DOTs and experts nationwide have pursued the development of the Dedicated Short-Range Communications (DSRC) technology and related standards, which are designed for significantly improving safety measures through vehicle-to-vehicle (V2V) and vehicle-to-infrastructure (V2I) communications. The USDOT pilot test program concluded that DSRC can reduce vehicle related accident significantly. The USDOT also issued a recommendation that the DSRC technology should be mandated for all new light vehicles in the near future.

One important category of vehicle-related accidents involves pedestrian-vehicle collision. In the US in 2015, the number of pedestrian fatalities caused by vehicle accidents was 5,376, a 23% increase from 2009. Pedestrians' fatality is one of the few categories that experienced an increase in the past few years. Furthermore, most of the pedestrian accidents happen in urban areas.

One of the many accident scenarios that involve pedestrians is when a stopping vehicle occludes a crossing pedestrian from being viewed by other vehicles. A second passing vehicle's driver only notices the presence of a crossing pedestrian after the pedestrian is within a very close proximity to the second vehicle as shown in FIG. 1. In such scenario, the passing vehicle driver may fail to stop the vehicle in a timely manner, due to the close proximity to the pedestrian, and this leads to a potential injury or even fatality for the pedestrian.

A variety of new vehicle models typically include an Advanced Driver Assistant System (ADAS) that helps prevent pedestrian and other forms of accidents. The success of such system usually depends on the distance between the moving vehicle and pedestrian and on the vehicle speed.

This section provides background information related to the present disclosure which is not necessarily prior art.

SUMMARY

This section provides a general summary of the disclosure, and is not a comprehensive disclosure of its full scope or all of its features.

A method is presented for sharing data across vehicles for improved safety. In a transmitting vehicle, the method includes: detecting an object in an image captured by an imaging device in a transmitting vehicle; determining a first location of the object from the image, where the first location of the object is defined with respect to the transmitting vehicle; sending the first location of the object from the transmitting vehicle via a dedicated short range communication link to a receiving vehicle. In the receiving vehicle, the method includes: receiving the first location of the object from the transmitting vehicle; determining a vehicle location of the transmitting vehicle with respect to the receiving vehicle; determining a second location of the object using the first location and the vehicle location, where the second location is defined with respect to the receiving vehicle; and implementing a safety measure in the receiving vehicle based on the second location of the object.

In one embodiment, the object is detected using the You Only Look Once (YOLO) object detection algorithm.

The first location of the object further can be determined by calculating a distance to the object by $$l = f_c \frac{R_h}{I_h}$$

where the object is a person, $f_c$ is the focal length of the imaging device, $R_h$ is actual height of the person and $I_h$ is height of the person in image pixels. In some instance, the first location of the object is sent from the transmitting vehicle only if the distance between the object and the transmitting vehicle is less than a predefined threshold. In other instance, the first location of the object is sent to from the transmitting vehicle to the receiving vehicle when the two vehicles are traveling in the same direction.

Example safety measure include but are not limited to issuing a warning about the object to a driver of the receiving vehicle, displaying the object to the driver of the receiving vehicle or automatically braking the receiving vehicle.

In some embodiments, the method further includes capturing, by a camera disposed in the receiving vehicle, video of a scene; receiving the image data for the object from the transmitting vehicle; fusing the image data for the object into the video; and presenting the video with the image data fused therein to the driver of the receiving vehicle.

A collision avoidance system is also presented. The system includes: a first camera, a first image processor and a first transceiver disposed in a transmitting vehicle. The first image processor is configured to receive image data from the first camera and operates to detect an object in the image data and to determine a first location for the object from the image data, where the first location is defined with respect to the transmitting vehicle. The first transceiver is interfaced with the first image processor and sends the first location for the object via a wireless communication link to a receiving vehicle.

The system also includes a second transceiver and a second image processor in the receiving vehicle. The second transceiver is configured to receive the first location of the object from the transmitting vehicle. The second image processor is interfaced with the second transceiver, and operates to determine a vehicle location of the transmitting vehicle with respect to the receiving vehicle and to determine a second location of the object using the first location and the vehicle location, where the second location is defined with respect to the receiving vehicle. In some embodiments, the second image processor implements a safety measure in the receiving vehicle based on the second location of the object.

In an example embodiment, the first location of the object is transmitted from the transmitting vehicle to the receiving vehicle in accordance with Dedicated Short-range Communication (DSRC) protocol.

The transmitting vehicle may also send image data for the object via a secondary communication link that differs from the primary wireless communication link between the vehicles.

The collision avoidance system may further include an automatic emergency braking system in the receiving vehicle, wherein the second image processor operates to automatically braking the receiving vehicle based on the second location of the object.

In some embodiments, the receiving vehicle includes a camera, such that the second image processor receiving video from the second camera, fuses the image data for the object with the video, and presents the video with the image data to the driver of the receiving vehicle.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 2:
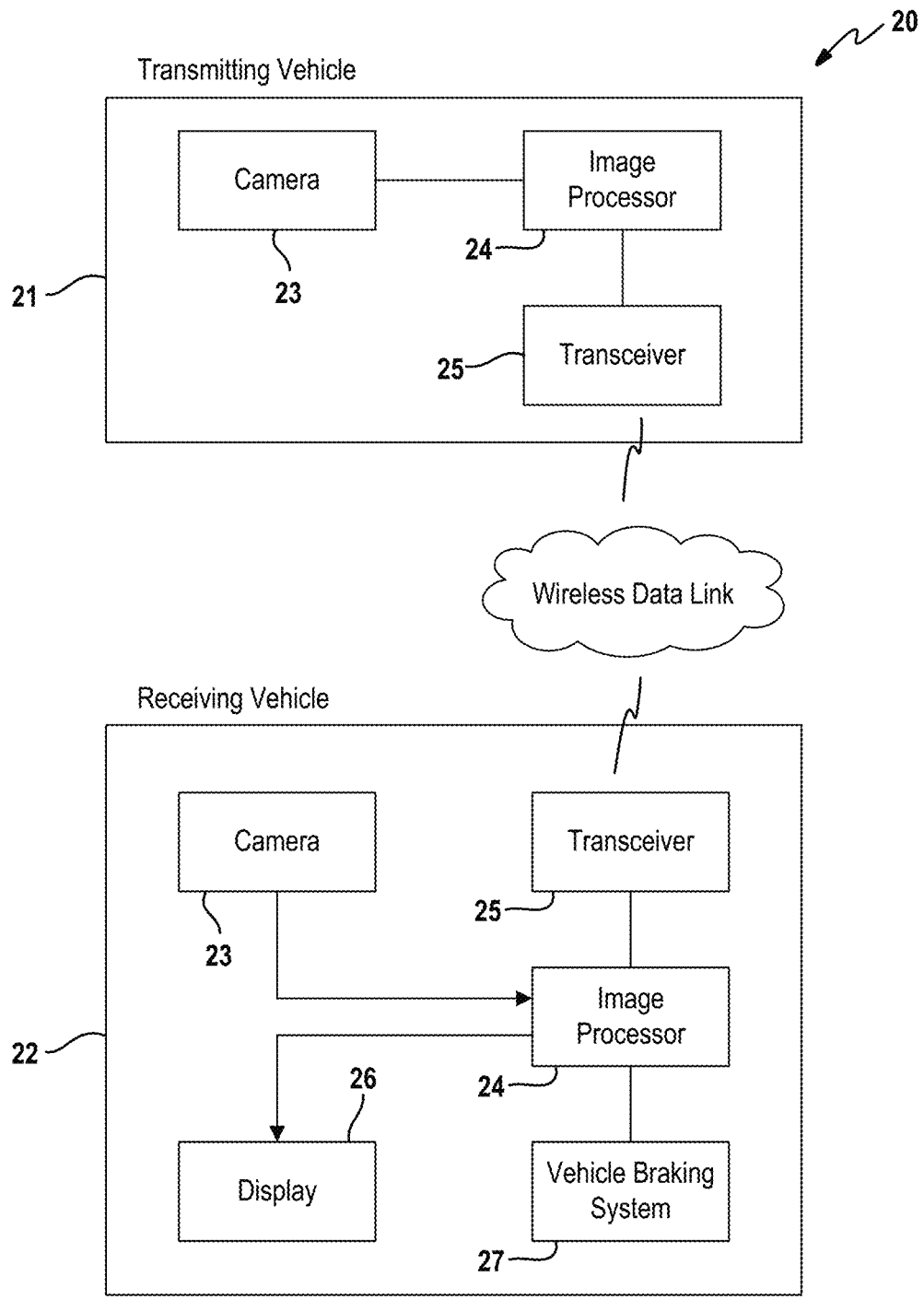
FIG. 2 is a diagram of a collision avoidance system.

FIG. 2 depicts an example of a collision avoidance system 20. The collision avoidance system 20 is deployed in across vehicles. In this example, the collision avoidance system 20 is operational between a transmitting vehicle 21 and a receiving vehicle 22. Each vehicle 21, 22 is equipped with an imaging device 23, an image processor 24, and a transceiver 25. The vehicles may also be equipped with other conventional vehicle subsystems, including but not limited to a vehicle navigation system with a display 26 as well as an automatic emergency braking system 27, such as the Pedestrian Collision Avoidance System (PCAS). More or less vehicles may be equipped in a similar manner and comprise part of the system. In some embodiments, designated infrastructure-locations, such as signs, traffic signals, bridges, etc., can also be equipped in a similar manner and comprise part of the system 20.

In the example embodiment, the imaging device 23 is a camera integrated into a vehicle. The system can be extended to employ any sensor modality including lidars, radars, ultrasonic sensors, etc. A more powerful system can be realized by the fusion of a multimodal-sensor system such as any combination of cameras, lidars, radars, and/or ultrasonic sensors. In cases of sensor modalities that generate a large amount of data, the need for data compression could become necessary. Hence, in the case of using visual sensors, video compression/decompression will be critical for achieving efficient communication among the vehicles and/or infrastructure. Any state-of-the-art video coding standards or technology that is either standalone or built-in within popular cameras can be used.

In an example embodiment, the image processor 24 is a Nvidia Drive PX 2 processor. It should be understood that the logic for the control of image processor 24 can be implemented in hardware logic, software logic, or a combination of hardware and software logic. In this regard, image processor 24 can be or can include any of a digital signal processor (DSP), microprocessor, microcontroller, or other programmable device which are programmed with software implementing the above described methods. It should be understood that alternatively the controller is or includes other logic devices, such as a Field Programmable Gate Array (FPGA), a complex programmable logic device (CPLD), or application specific integrated circuit (ASIC). When it is stated that image processor 24 performs a function or is configured to perform a function, it should be understood that image processor 24 is configured to do so with appropriate logic (such as in software, logic devices, or a combination thereof).

In the example embodiment, the wireless network between vehicle is based on underlying DSRC transceivers 25 that adhere to the Intelligent Transportation System of America (ITSA) and 802.11p WAVE standards, and which are certified by the US DOT. By default, DSRC equipment periodically sends Basic Safety Messages (BSM). The messages contain vehicle status and applications information. DSRC is merely illustrative of how a wireless data link may be established between vehicles and other communication protocols fall within the broader scope of this disclosure.

Figure 3:
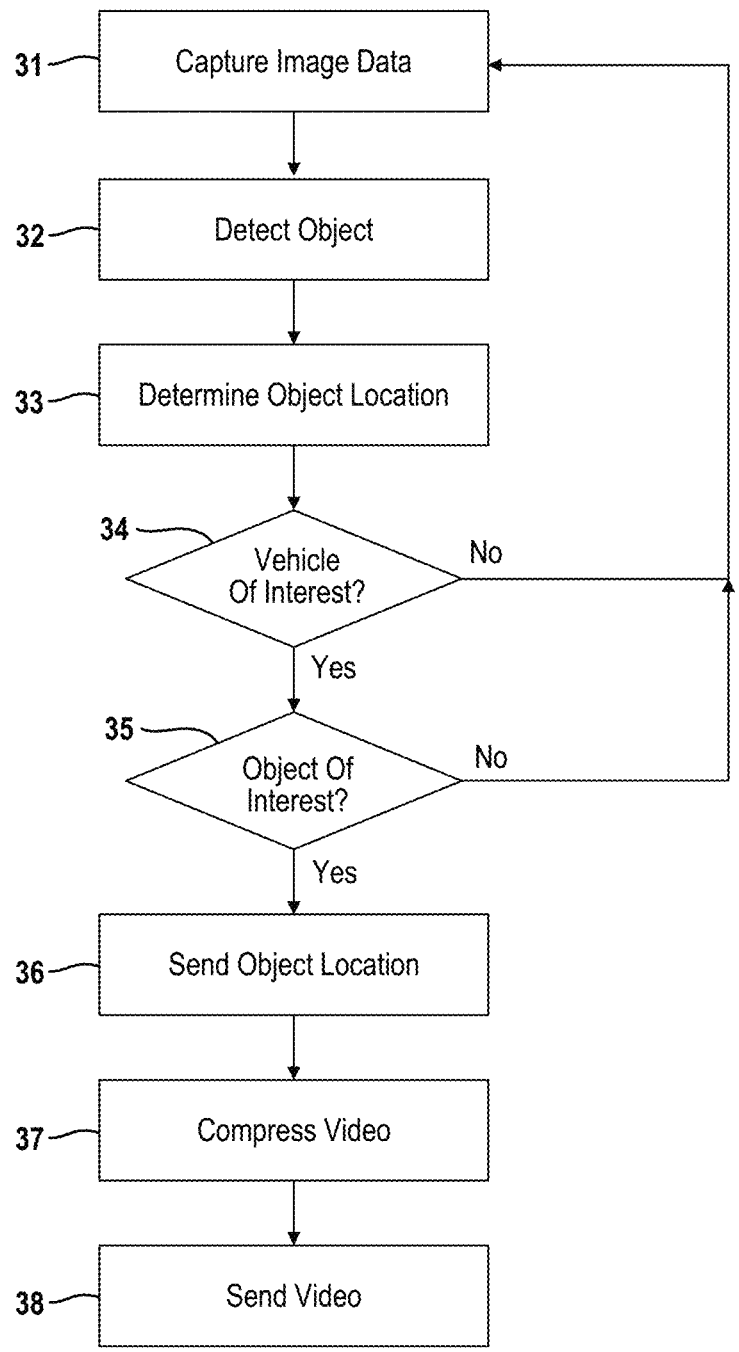
FIG. 3 is a flowchart illustrating an example process for sharing data by a transmitting vehicle.

FIG. 3 illustrates an example process for sharing data by a transmitting vehicle. Image data is captured at 31 using an imaging device in the transmitting vehicle. Image data may be captured continuously, periodically or in response to a trigger signal. In the example embodiment, the imaging device is a camera although other types of imaging devices are contemplated by this disclosure.

Image data is then analyzed at 32 to detect and/or identify objects of interest, such as a pedestrian, another vehicle or other potential hazards. In an example embodiment, objects are detected using a You Only Look Once (YOLO) object detection algorithm. For further details regarding YOLO object detection, reference may be had to "YOYLO9000: Better, Faster, Stronger" ArXiv:1612.08242 December 2016 which is incorporated by reference. It is readily understood that other object detection methods also fall within the scope of this disclosure.

Next, a determination is made regarding whether to share data about the detected object with other vehicles. In this regard, the location of the object is determined at 33 from the image data. This first location of the object is defined with respect to the location of the transmitting vehicle. That is, the transmitting vehicle serves as the reference frame for this first location. Techniques for determining a distance to an object from the imaging data is readily known in the art. For example, when a vehicle detects a pedestrian crossing, it estimates the pedestrian distance l as follows:

$$l = f_c \frac{R_h}{I_h} \quad (1)$$

where $f_c$ is the focal length and $R_h$ and $I_h$ are the real pedestrian height in meter and height in image pixels, respectively.

Two different criteria are applied before sharing object information, including its location, with nearby vehicles. First, a criterion may be applied to determine whether a nearby vehicle is a vehicle of interest (i.e., a vehicle to which the object information is to be sent to) as indicated at 34. An example criterion is that object information should only be sent to vehicles located next to or behind the transmitting vehicle. Vehicles in front of the transmitting vehicle are not of interest and will not be sent object information. Other example criteria are that vehicles of interest should be traveling in the same direction as the transmitting vehicle and/or should be no more than two lanes away from the transmitting vehicle. Other types of vehicle criteria are contemplated by this disclosure.

Second, a criterion is applied to determine whether the object is of interest to the recipient vehicle as indicated as 35. For example, only objects within a predefined distance (e.g., I<50 meters) from the transmitting vehicle are deemed to be objects of interest. Objects falling outside of the predefined distance are not of interest and information about these objects will not be shared with other vehicles. Likewise, other types of object criteria are contemplated by this disclosure.

For each vehicle of interest, object information is sent at 36 via a wireless data link from the transmitting vehicle to the vehicle of interest (i.e., receiving vehicle). In an example embodiment, the wireless network is based on underlying DSRC transceivers that adhere to Intelligent Transportation System of America (ITSA) and 802.11p WAVE standard. In this case, object information is transmitted periodically using Basic Safety Messages (BSM) over the DSRC link. Again, it is only necessary to send information for objects of interest.

Furthermore, image data for an object of interest (e.g., video segment) is sent to the vehicle of interest. To do so, the transmitting vehicle establishes another secondary data connection between the transmitting vehicle and the receiving vehicle. In one example, the transmitting vehicle may establish a TCP connection with the vehicle of interest. Rather than sending all of the captured image data, the transmitting vehicle can send only data corresponding to the object of interest. For example, the transmitting vehicle sends the image data contained in a boundary box that frames the object as designated by the object detection algorithm. Prior to sending the image data, the image data is preferably compressed as indicated at 37. For example, the image data can be compressed using a compression algorithm, such as Motion JPEG. Different types of compression methods fall within the broader aspects of this disclosure. In any case, the image data for the object is sent at 38 by the transmitting vehicle to the receiving vehicle. It is to be understood that only the relevant steps of the processing by the image processor 24 are discussed in relation to FIG. 3, but that other software-implemented instructions may be needed to control and manage the overall operation of the system.

Figure 4:
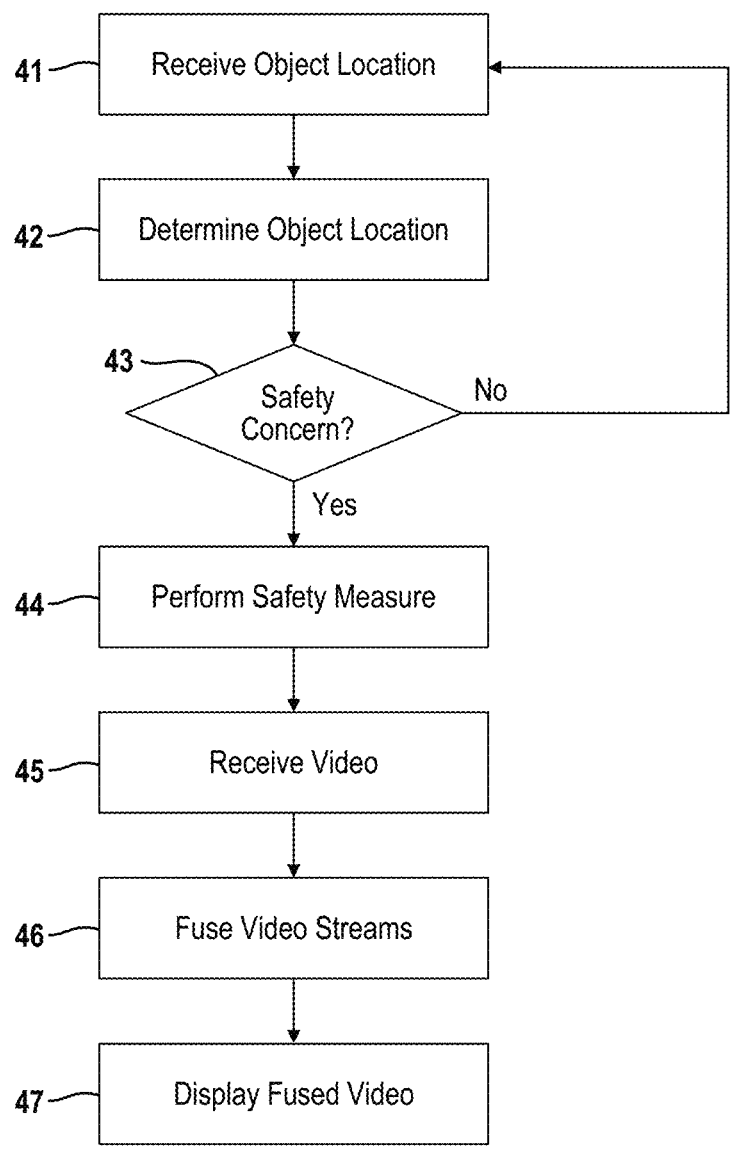
FIG. 4 is a flowchart illustrating an example process for fusing data by a receiving vehicle.

FIG. 4 illustrates how shared data is processed by a receiving vehicle. Table 1 defines the variables that are used in system parameter calculations set forth below.

TABLE 1

| | |
|---|---|
| A | Vehicle A |
| B | Vehicle B |
| C | Pedestrian |
| D | Expected collision point |
| w | Vehicle width |
| d | Vertical distance between vehicle A and B (similar to ΔZ) |
| l | Distance between vehicle B and pedestrian |
| e | Horizontal distance between vehicle A and B (similar to Δχ) |
| r | Horizontal distance between pedestrian and vehicle B |
| α | Angle between vehicle A and pedestrian |
| β | Angle between vehicle B and pedestrian |
| n | Euclidian distance between vehicle A and pedestrian |
| k | Euclidian distance between vehicle B and pedestrian |
| ΔY | Difference between camera A and camera B altitude |

The reported locations could be measured in any distance units. For example, they could be in meters as used in the Universal Transverse Mercator (UTM) coordinate format. Also, the camera location is considered as a vehicle reference location. If more than one pedestrian is detected, the same calculations can be performed for each pedestrian. Meanwhile, it is possible to combine two pedestrians, who are adjacent or in close proximity, as one pedestrian. Here, and for illustrative purposes only, the focus is on a single pedestrian crossing. Each vehicle has Vehicle of Interest (VoI) list that includes all vehicles that may share useful information to the ego-vehicle.

Object information is received at 41 by the receiving vehicle. Object information received by the receiving vehicle may include a distance between the two vehicles. For example, the exchanged information may include a vertical distance and a horizontal distance between the vehicles. In this way, the receiving vehicle is able to determine the location of the transmitting vehicle in relation to itself. As noted above, this information may be periodically exchanged using messages sent over a DSRC link. Other types of wireless links could also be used by the vehicles.

Next, the location of the object is determined at 42 by the receiving vehicle. This location of the object is defined with respect to the location of the receiving vehicle. That is, the receiving vehicle serves as the reference frame for this second location of the object. In the example embodiment, this second location is derived using the first location of the object sent by the transmitting vehicle and the distance between the two vehicles as will further described below.

Figure 5:
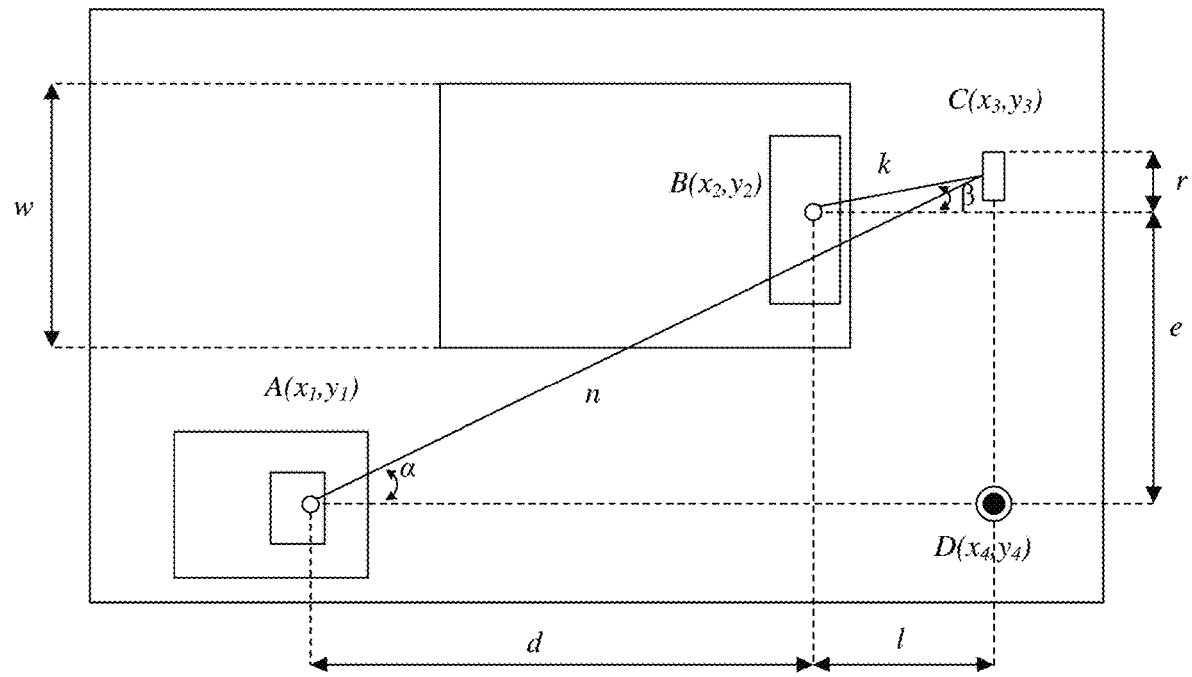
FIG. 5 is a schematic of an example collision scenario.

From the location of the object, a safety concern can be evaluated at 43 by the receiving vehicle. In one embodiment, the receiving vehicle computes an expected collision point, D, between the object and the receiving vehicle as seen in FIG. 5. The receiving vehicle can also compute a distance to collision (DTC) and/or a time to collision (TTC) as follows.

$$DTC = l + d \quad (2)$$

$$TTC = \frac{DTC}{S_A} \quad (3)$$

where $S_A$ is the speed of vehicle A (e.g., in meters per second). These metrics are merely exemplary.

Based on the second location of the object, a safety measure can be implemented in the receiving vehicle as indicated at 44. For example, assuming an expected collision point exists, a safety concern can be raised and a warning can be issued to the driver of the receiving vehicle. The warning can be issued at a fixed interval (e.g., 5 seconds) before an anticipated collision. The warning may a visual, audible and/or haptic indicator. In response to a raised safety issue, the receiving vehicle may also implement an automated preventive measure, such as automatic braking of the vehicle.

Additionally, video for the detected object is received at 45 by the receiving vehicle. The received video can then be fused at 46 with the video captured by the receiving vehicle. Continuing with the example in FIG. 5, the image of the obscured pedestrian can be integrated into the video captured by the receiving vehicle. One technique for fusing the data is set forth below.

After vehicle B receives a request for video streaming, vehicle B shares only detected pedestrian region of the image, also called Region of Interest (RoI). Before sending the RoI to vehicle A, the RoI is compressed into a video stream. When the vehicle receives the first image of the video stream, it has to determine if it is within the local camera Horizontal Field Of Viewing (HFOV). Hence, angle $\angle \alpha$ is calculated as shown in FIG. 5.

$$\angle a = \arctan\left(\frac{r+e}{d+l}\right) \quad (4)$$

where $$r = \tan(\beta) * l \quad (5)$$

Note that r might be negative if $\angle \beta$ is negative. $\angle \beta$ is estimated by vehicle B. A simple way to estimate an object's horizontal angle is by measuring the average horizontal object pixels' locations to the camera Horizontal Field of View (HFOV) as follows:

$$\angle \beta = \frac{HFOV}{2} - \left(\frac{u}{u_{max}} * HFOV\right) \quad (6)$$

Figure 6:
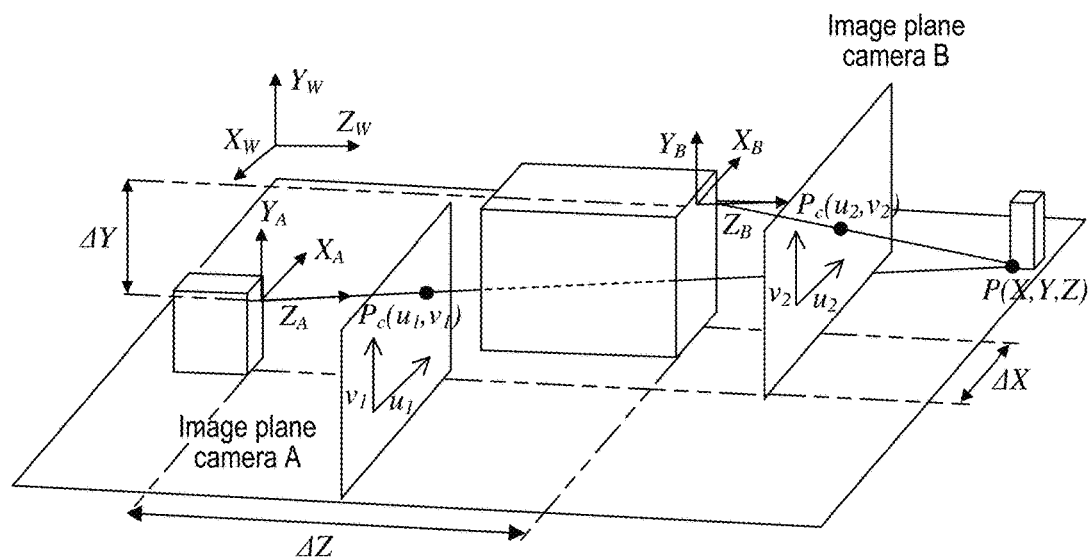
FIG. 6 is a diagram depicting pin hole model and image transpose calculations.

When $\angle \beta$ is positive, the object is on the left side of the camera and vice versa. Now if $\angle \alpha$ is larger than HFOV of vehicle A, only audible warning is made to the driver. Otherwise the pedestrian image is transposed on the local video stream image. As shown in FIG. 6, using the camera pinhole model, the object is transferred from camera B image plane to camera A image plane as follows:

$$u_1 = \frac{fc_x(X + \Delta X)}{Z + \Delta Z} \quad (7)$$

$$v_1 = \frac{fc_y(Y + \Delta Y)}{Z + \Delta Z}$$

$\Delta X$, $\Delta Y$ and $\Delta Z$ are the differences in coordinate between the two cameras' locations which are similar to variables shown in FIG. 5. Both variables X and Y are estimated from camera B using:

$$X = \frac{Z * u_2}{fc_x} \quad (8)$$

$$Y = \frac{Z * v_2}{fc_y}$$

After imposing the detected object on camera A image, the fused image is presented to the driver at 47 on a display. The process is repeated until vehicle B stops sharing detected object information. To avoid sharing unnecessary information, vehicle B stops sharing detected object information when the object is no longer in front of the vehicle and visible to other vehicles $$\left(\text{i.e. } r > \frac{w}{2}\right).$$

It is important to note that share sensors information might be updated at a different rate. As a result, time (clock) synchronization between the two vehicles is necessary. It is to be understood that only the relevant steps of the processing by the image processor 24 are discussed in relation to FIG. 4, but that other software-implemented instructions may be needed to control and manage the overall operation of the system.

Experimental setup and results are now described for the example embodiment of the collision avoidance system 20. The experimental setup consists of two vehicles (e.g., SUV and Sedan). In each vehicle, a Cohda (MK5 DSRC transceiver, Global Navigation Satellite System GNSS) and a dashboard camera (DashCam) is installed. Although DSRC transceivers are equipped with GNSS, this embodiment opted to use a separate Real-Time Kinematic (RTK) GNSS because RTK-GNSS offers a high-accuracy location estimates when compared to standalone GNSS that is used in DSRC transvers. In these experiments, Emlid Reach RTK GNSS receiver is used, which is a low-cost off-the-shelf device. To store the collected data, all sensors on each vehicle are connected to a laptop that has Robotic Operation System (ROS) installed on it. Two vehicles' laptops are connected via DSRC transceivers during the data collection to synchronize laptop clocks. In addition, a bandwidth test experiment was conducted between two vehicles to verify the available bandwidth and to emulate channel performance when conducting the experiment in the lab.

The RTK-GNSS output was set to the maximum limit of 5 Hz and the camera to 24 Frame Per second (FPS). The DSRC data rate channel was set to 6 Mbps. The experiment was conducted on the Michigan State University campus and surrounding areas with wide ranging speed limits up to 55 kilometer-per-hour (kph). All of the experiments were conducted during daytime. In the first part, channel bandwidth test was collected while driving at a speed ranging between 0 and 55 kph; and the distance between the two vehicles' DSRC transceivers ranged from 5 to 100 meters. In the second part, a pedestrian pre-collision scenario was simulated and coordinated by a test team.

In the lab setup, two ROS supported desktop PC were used and connected with stationary DSRC transceivers. The distance between the two transceivers is fixed to 5 meters. To emulate the moving vehicle, based on the road test findings, a random delay of 5 to 15 milliseconds delay was added to the channel and the maximum channel bandwidth set to 1.8 Mbps. Both PCs have core 17 processor and one PC with NVIDIA GTX 1080ti GPU. The GPU capable PC represents vehicle B while the other PC represents vehicle A. Proposed system components were implemented as ROS nodes. You Only Look Once (YOLO) object detection algorithm was used in the lab experiment, such that the algorithm for pedestrian detection was trained using Visual Object Classes (VOC) data set. Also, Motion JPEG (MJPEG) was used as the video/image encoding/decoding technique.

Figure 7:
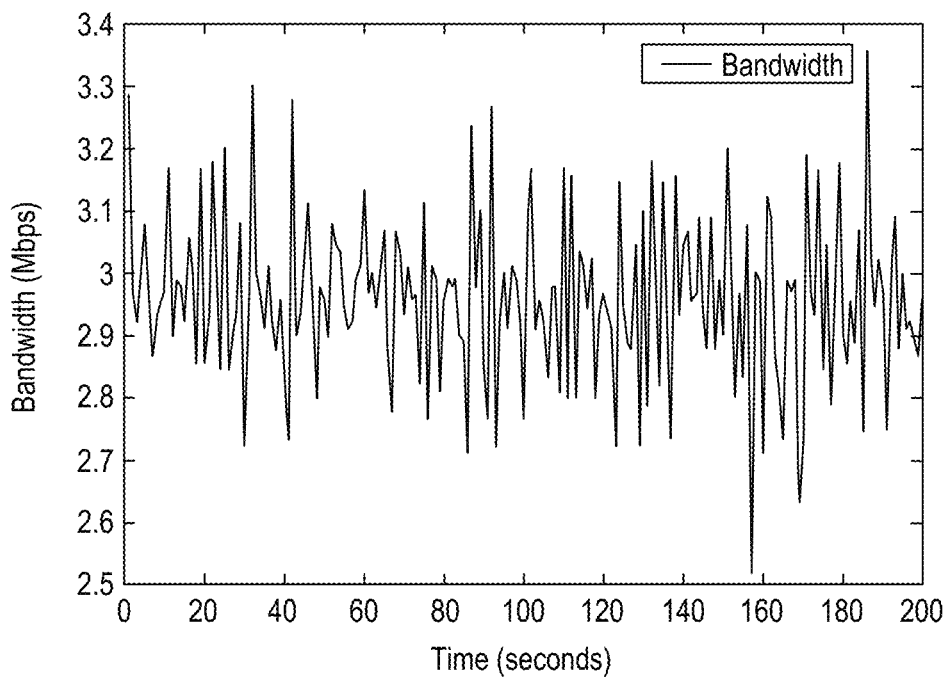
FIG. 7 is a graph illustrating bandwidth between two DSRC units.
Figure 8:
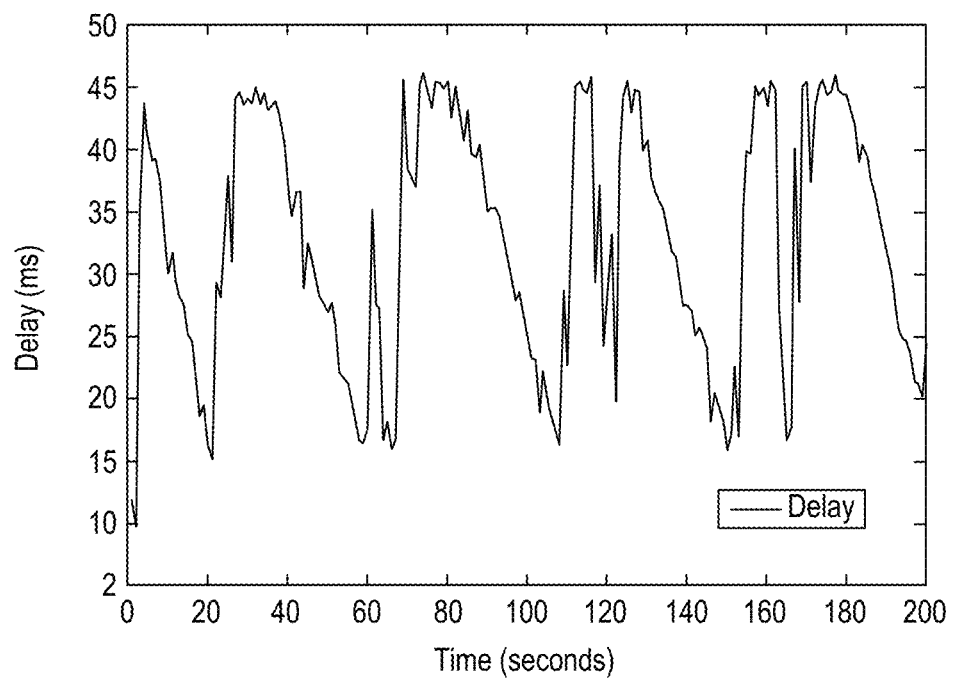
FIG. 8 is a graph illustrating packet delay between two DSRC units.
Figure 10A:
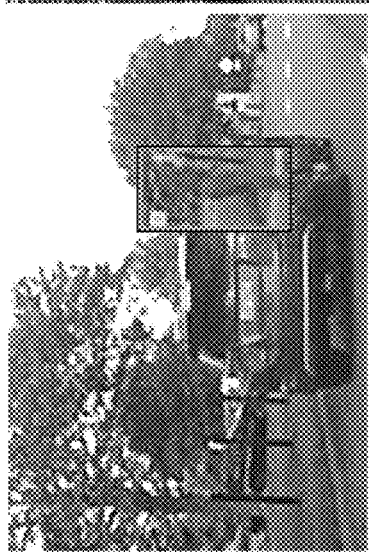
FIG. 10A-10F are an example of fused images shown to the driver of the collision avoidance system.
Figure 10B:
Figure 10C:
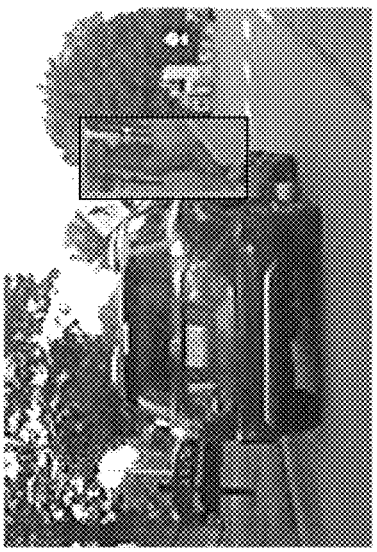
Figure 10D:
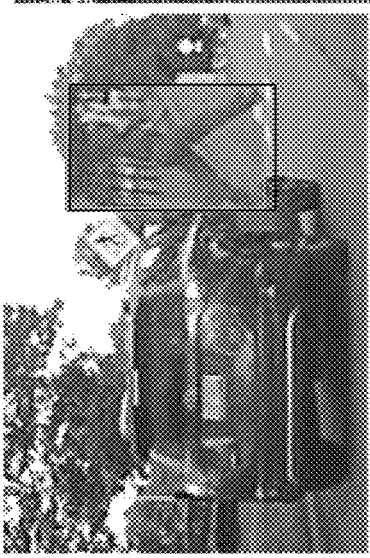
Figure 10E:
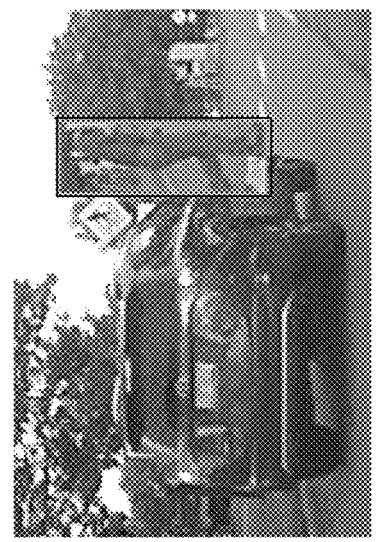
Figure 10F:
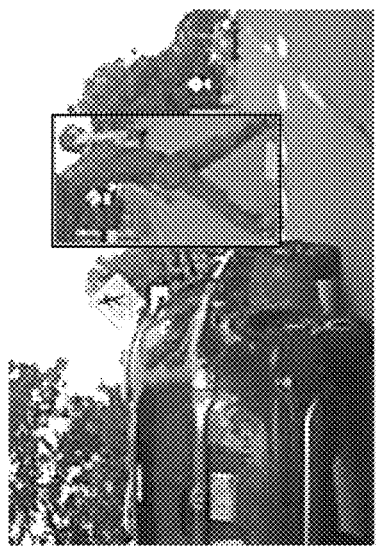

FIGS. 7 and 8 show a sample of DSRC bandwidth and packet delay test results, respectively. During this sample results, the distance between the two vehicles was 90 to 120 meters and at a speed of 55 kph. The average bandwidth and delay were 2.85 Mbps and 34.5 ms respectively. It was found that DSRC equipment can carry high quality video stream with minimal delay. Similar findings are found in P. Gomes et al "Making Vehicles" Transparent Through V2V Video Streaming" IEEE Transactions on Intelligent Transportation Systems 13 (2012).

Object detection algorithm YOLO was able to process 8-10 FPS which is considered acceptable. However, it is possible to achieve higher processing using automotive oriented hardware. As discussed earlier, after a pedestrian is detected, the pedestrian distance and angle is estimated. The Region of Interest (ROI) is extracted from the original image and sent to the video/image encoder. The M-JPEG encoder compresses each image individually as a JPEG image. This compression method saves a significant amount of time compared to other advance video compression techniques. The average compressed image size is 3.5 KB which is much smaller than sharing the full image. For example, a high quality H.264 video stream of 640×480 at 10 FPS requires a 1.029 Mbps while selective sharing at 10 FPS would need only 280 Kbps. However, limit the video streaming rate to 5 Hz similar to GNSS update rate to achieve best accuracy. Pedestrian distance l and <β are sent at the detection rate which is 8 to 10 Hz.

Figure 1:
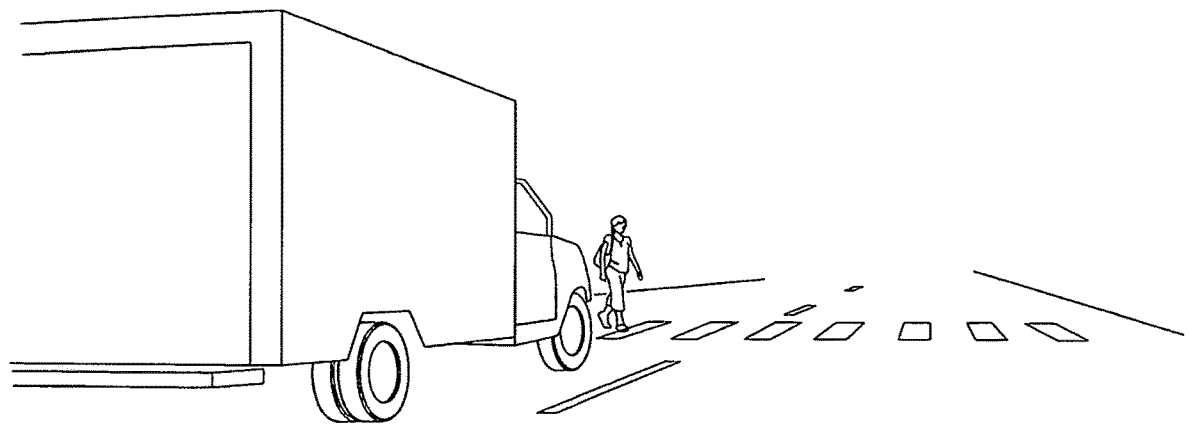
FIG. 1 is a picture of an example pedestrian collision scenario.
Figure 9:
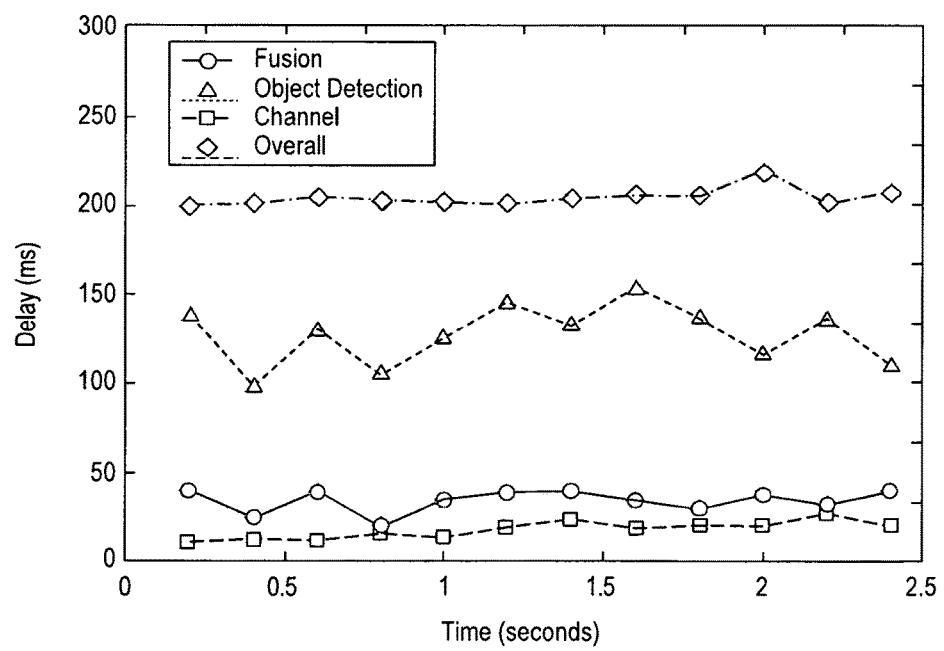
FIG. 9 is a graph illustrating various delay in the proposed collision avoidance system.

FIG. 9 depicts the delay at every step of operation, where overall delay is between two consecutive image fusions including the display of the final fused image. The average overall delay is 200 ms which is similar to the video sharing rate of 5 Hz, mainly due to the fact that the GNSS update is limited to 5 Hz. The fusion processes delay average is 33 ms and includes the delay caused by calculation, fusion and synchronization between remote and local data. Meanwhile the average channel object detection delays are 10 ms and 122 ms respectively. It is clear that the sum of the fusion, channel and object detection is less than overall delay, suggesting the 200 ms delay is not possible to increase the information sharing rate by a) improving object detection processing rate without decreasing detection accuracy b) increasing GNSS rate.

TABLE 2

| Time (seconds) | Speed (m/s) | DTC (m) | TTC (seconds) |
|---|---|---|---|
| 0 | 8.98 | 20.1 | 2.25 |
| 0.2 | 8.94 | 19.1 | 2.18 |
| 0.4 | 8.65 | 17.99 | 2 |
| 0.6 | 8.64 | 16.5 | 1.9 |
| 0.8 | 8.49 | 15.62 | 1.8 |
| 1 | 8.31 | 14.4 | 1.61 |
| 1.2 | 7.77 | 12.79 | 1.53 |
| 1.4 | 7.64 | 11.5 | 1.47 |
| 1.6 | 7.64 | 10.8 | 1.42 |
| 1.8 | 7.10 | 10.1 | 1.41 |
| 2 | 6.52 | 9.4 | 1.43 |
| 2.2 | 6.13 | 9.1 | 1.4 |
| 2.4 | 5.94 | 8.3 | 1.9 |

Table 2 shows the calculations that are conducted during our pre-collision interaction which lasted 2.4 seconds. During that interaction, the driver is warned about pedestrian crossing. A sample of the fused images is shown in FIGS. 10A-10F.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for sharing data across vehicles for improved safety, comprising:
    detecting, by a processor in a transmitting vehicle, an object in an image captured by an imaging device in a transmitting vehicle;
    determining, by the processor in the transmitting vehicle, a first location of the object from the image, where the first location of the object is defined with respect to the transmitting vehicle;
    determining, by the processor in the transmitting vehicle, whether the transmitting vehicle and the receiving vehicle are traveling the same direction;
    sending the first location of the object from the transmitting vehicle via a dedicated short range communication link to a receiving vehicle in response to a determination that the transmitting vehicle and the receiving vehicle are traveling the same direction;
    receiving, by a processor in the receiving vehicle, the first location of the object from the transmitting vehicle;
    determining, by the processor in the receiving vehicle, a vehicle location of the transmitting vehicle with respect to the receiving vehicle;
    determining, by the processor in the receiving vehicle, a second location of the object using the first location and the vehicle location, where the second location is defined with respect to the receiving vehicle; and
    implementing a safety measure in the receiving vehicle based on the second location of the object.

2. The method of claim 1 further comprises detecting an object in an image captured by an imaging device using You Only Look Once object detection algorithm.

3. The method of claim 1 wherein determining a first location of the object further comprises calculating a distance to the object by $$l = f_c \frac{R_h}{I_h}$$

where the object is a person, fc is the focal length of the imaging device, Rh is actual height of the person and lh is height of the person in image pixels.

4. The method of claim 1 further comprises sending the first location of the object from the transmitting vehicle only if a distance between the object and the transmitting vehicle is less than a predefined threshold.

5. The method of claim 1 further comprises computing at least one of a distance to collision with the object or a time to collision with the object and implementing a safety measure in the receiving vehicle in response to the at least one of the distance to collision or the time to collision being less than a threshold.

6. The method of claim 1 wherein implementing a safety measure includes one of issuing a warning about the object to a driver of the receiving vehicle, displaying the object to the driver of the receiving vehicle or automatically braking the receiving vehicle.

7. The method of claim 1 further comprises sending image data for the object from the transmitting vehicle via a secondary communication link to the receiving vehicle, where the secondary communication link differs from the dedicated short range communication link.

8. The method of claim 7 further comprises
    capturing, by a camera disposed in the receiving vehicle, video of a scene;
    receiving, by the processor in the receiving vehicle, the image data for the object from the transmitting vehicle;
    fusing, by the processor in the receiving vehicle, the image data for the object into the video; and
    presenting, by the processor in the receiving vehicle, the video with the image data fused therein to the driver of the receiving vehicle.

9. A method for detecting objects in a moving vehicle, comprising:
    receiving, by a processor in a receiving vehicle, a first location of the object from the image, where the first location is communicated via a wireless data link by a transmitting vehicle and the first location of the object is defined with respect to the transmitting vehicle;
    determining, by the processor in the receiving vehicle, a vehicle location of the transmitting vehicle with respect to the receiving vehicle;
    determining, by the processor in the receiving vehicle, a second location of the object using the first location and the vehicle location, where the second location is defined with respect to the receiving vehicle;
    implementing a safety measure in the receiving vehicle based on the second location of the object;
    receiving, by the processor of the receiving vehicle, image data for the object sent by the transmitting vehicle;
    capturing, by a camera disposed in the receiving vehicle, video of a scene;
    fusing, by the processor in the receiving vehicle, the image data for the object into the video; and
    presenting, by the processor in the receiving vehicle, the video with the image data fused therein to the driver of the receiving vehicle.

10. The method of claim 9 receiving, by the processor in the receiving vehicle, distance between the transmitting vehicle and the receiving vehicle over a dedicated short range communication link.

11. The method of claim 9 further comprises computing at least one of a distance to collision with the object or a time to collision with the object and implementing a safety measure in the receiving vehicle in response to the at least one of the distance to collision or the time to collision being less than a threshold.

12. The method of claim 9 wherein implementing a safety measure includes one of issuing a warning about the object to a driver of the receiving vehicle, displaying the object to the driver of the receiving vehicle, or automatically braking the receiving vehicle.

13. A collision avoidance system, comprising:
a first camera disposed in a transmitting vehicle;
a first image processor configured to receive image data from the first camera, the first image processor operates detect an object in the image data and determine a first location for the object from the image data, where the first location is defined with respect to the transmitting vehicle;
a first transceiver interfaced with the first image processor and operates to send the first location for the object via a wireless communication link to a receiving vehicle;
wherein the first image processor determines whether the transmitting vehicle and the receiving vehicle are traveling the same direction and sends the first location of the object to the receiving vehicle in response to a determination that the transmitting vehicle and the receiving vehicle are traveling the same direction;
a second transceiver disposed in the receiving vehicle and configured to receive the first location of the object from the transmitting vehicle;
a second image processor interfaced with the second transceiver, the second image processor operates to determine a vehicle location of the transmitting vehicle with respect to the receiving vehicle and determine a second location of the object using the first location and the vehicle location, where the second location is defined with respect to the receiving vehicle.

14. The collision avoidance system of claim 13 wherein the first image processor determines the first location of the object by calculating a distance to the object as follows $$l = f_c \frac{R_h}{l_h}$$

where the object is a person, fc is the focal length of the first camera, Rh is actual height of the person and lh is height of the person in image pixels.

15. The collision avoidance system of claim 14 wherein the first image processor sends the first location of the object from the transmitting vehicle only if a distance between the object and the transmitting vehicle is less than a predefined threshold.

16. The collision avoidance system of claim 13 wherein the first location of the object is transmitted in accordance with Dedicated Short-range Communication (DSRC) protocol.

17. The collision avoidance system of claim 13 wherein the second image processor implements a safety measure in the receiving vehicle based on the second location of the object.

18. The collision avoidance system of claim 17 wherein the second image processor computes at least one of a distance to collision with the object or a time to collision with the object and implements a safety measure in the receiving vehicle in response to the at least one of the distance to collision or the time to collision being less than a threshold.

19. The collision avoidance system of claim 17 further comprises an automatic emergency braking system in the receiving vehicle, wherein the second image processor operates to automatically braking the receiving vehicle based on the second location of the object.

20. The collision avoidance system of claim 17 wherein the first transceiver send image data for the object from the transmitting vehicle via a secondary communication link to the receiving vehicle, where the secondary communication link differs from the wireless communication link.

21. The collision avoidance system of claim 20 further comprises a second camera in the receiving vehicle, wherein the second image processor receiving video from the second camera, fuses the image data for the object with the video, and presents the video with the image data to the driver of the receiving vehicle.

* * * * *